July 11, 1961

D. W. VAREL 2,991,966

TELESCOPING MAST AND ELEVATOR MECHANISM
FOR STABILIZING DRILL UNIT
Filed April 6, 1959

INVENTOR.
Daniel W. Varel
BY
ATTORNEY

United States Patent Office 2,991,966
Patented July 11, 1961

2,991,966
TELESCOPING MAST AND ELEVATOR MECHANISM FOR STABILIZING DRILL UNIT
Daniel W. Varel, P.O. Box 13146, Dallas, Tex.
Filed Apr. 6, 1959, Ser. No. 804,442
4 Claims. (Cl. 248—125)

This invention relates to improvements in tool support apparatus, and more particularly, but not by way of limitation, to a tool support and stabilizer structure for supporting an electric drill, or the like, during the operation thereof.

Electric drills, or portable electric drills of many types are in widespread usage today for the drilling of holes in a variety of objects. These portable drills have many advantages in that they may be easily transported from place to place for utilization, whereas a larger or heavier type drill permanently mounted on a support stand is normally not easily moved. However, it is frequently desired to utilize the drill for drilling holes through an excessively hard surface, and to provide a substantially true bore therein. It is often desirable that the axis of the bore be substantially straight, and either vertically disposed or at any other desired angle of disposition. The bit of the drill is normally fed into the material being drilled through by manual force of the operator on the drill itself. It will be readily apparent that the force required to drill through a hard element may require excessive manual pressure by the operator, which renders it difficult to maintain a true line of penetration for the drill bit.

The present invention contemplates a support stand and stabilizing structure for supporting a portable drill during utilization thereof for drilling holes, particularly when drilling through an excessively hard element. The stand is provided with an adjustable upright member adapted to rigidly support the drill and maintain the drill at a convenient working height. The support stand is stabilized to overcome any forces due to the torque of the drill during operation thereof, and to assure an efficient supporting thereof. The novel drill stand may be quickly assembled and adjusted for supporting the drill in substantially any desired working location, thus facilitating the work of the operator, and greatly enhancing the versatility of the portable drill.

It is an important object of this invention to provide a drill stand to receive a portable drill for facilitating the operation thereof.

It is another object of this invention to provide a novel drill stand for receiving a portable drill in a manner wherein the drill is rigidly supported to assure an efficient operation thereof during the drilling of holes, particularly when drilling through a substantially hard element.

Another object of this invention is to provide a novel drill support stand wherein the stand is stabilized to overcome the forces of any torque during operation of the drill.

Still another object of this invention is to provide a novel support stand for a portable drill which may be quickly erected at substantially any desired working site for facilitating operation of the drill.

A further object of this invention is to provide a novel support stand for a portable drill which is simple and efficient in operation and economical and durable in construction.

Other objects and advantages of the invention will be evident from the following detailed description, read in conjunction with the accompanying drawings, which illustrate my invention.

Figure 1:
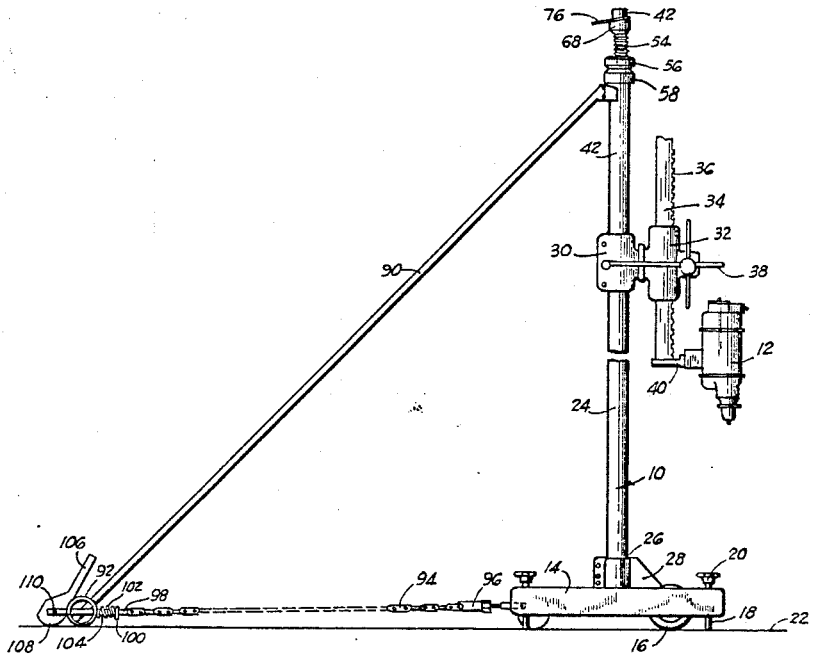
FIGURE 1 is a side elevational view of a drill stand embodying the invention.

Referring to the drawings in detail, reference character 10 indicates in general a drill stand for receiving and supporting a portable drill 12. The stand 10 comprises a base or platform 14 having a plurality of rollers or wheels 16 journalled therein to facilitate moving of the stand 10. A plurality of spaced threaded studs 18 extend transversely through the base 14 and are each provided with a suitable head portion 20 at the upper end thereof to facilitate rotation of the studs 18 whereby the base 14 may be raised sufficiently to lift the wheels 16 from the ground or working surface 22 during utilization of the stand 10. It will be apparent that the studs 18 may be adjusted to provide for leveling of the base 14, and function to carry the weight of the stand 10 during operation of the drill 12.

A stationary housing or tube 24 extends upwardly from the base 14 and is supported thereon by a collar 26 which may be integral with the base 14. A plurality of radially extending flanges or gussets 28 are circumferentially spaced on the outer periphery of the collar 26 for support thereof, as is well known. A collar or sleeve 30 is slidably secured around the housing 24 in any suitable manner (not shown) for facilitating the adjustment of the working height of the drill 12, as will be hereinafter set forth. A second sleeve 32 is rigidly secured or is preferably integral with the collar 30 and is disposed parallel thereto for receiving an upstanding drill carriage rod 34 therethrough. The carriage rod 34 is provided with a suitable rack member 36 extending longitudinally thereon for cooperation with a gear member (not shown) which is operable in the well known manner by a substantially cross-shaped handle 38 for moving the carriage rod 34 reciprocally within the sleeve 32. A horizontally disposed arm member 40 is rigidly secured to the lower portion of the carriage rod 34 for receiving the drill 12. It will be apparent that the drill 12 will be moved vertically upward or downward simultaneously with the carriage rod 34, thus providing for operation of the drill 12 during the penetration or drilling of holes in an object.

An elevator mast 42 is reciprocally disposed within the housing 24 and extends upwardly therefrom to receive a shank 44 in the upper end thereof. The shank 44 is provided with a circumferential shoulder 46 on the outer periphery thereof for bearing against the upper end 48 of the mast 42 for a purpose as will be hereinafter set forth. A horizontally disposed plate 50 is welded, or the like, to the shank 44 and is adapted to contact the ceiling (not shown) for facilitating support of the drill stand 10 during operation of the drill 12. A plurality of circumferentially spaced gussets 52 are provided between the shank 44 and the plate 50 for increasing the rigidity of the plate 50.

Figure 2:
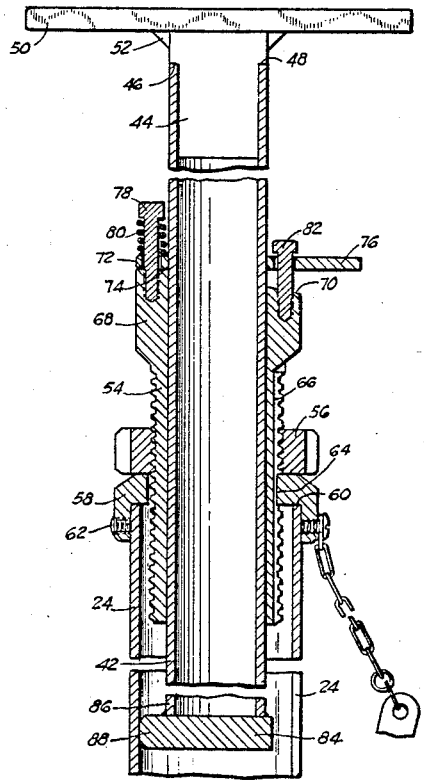
FIGURE 2 is an enlarged sectional elevational view of a portion of the telescopic mast of the novel drill stand.

A threaded elevator sleeve 54 is disposed around the mast 42 and extends downwardly into the housing 24, as clearly shown in FIG. 2. A nut 56 is threadedly secured on the sleeve 54 and is disposed adjacent an apertured cup member 58. The cup member 58 is disposed adjacent the upper end 60 of the housing 24 and is secured to the housing 24 by a plurality of spaced set screws 62. The cup 58 is provided with an inwardly extending flange or key member 64 adapted to be disposed in a longitudinal slot 66 provided on the outer periphery of the threaded elevator sleeve 54. It will thus be apparent that rotation of the nut 56 will cause the elevator sleeve 54 to move vertically with respect to the housing 24, and the flange 64 will cooperate with the slot 66 to preclude rotational movement of the elevator sleeve 54.

The elevator sleeve 54 is enlarged at 68 and is provided with a tapered surface 70 cooperating with a substantially straight or horizontal surface 72 at the top thereof. An annular ring 74 is disposed around the mast 42 and normally rests on the horizontal surface 72, as shown in FIG. 2. The right hand portion of the ring 74, as viewed in FIG. 2, is normally spaced above the tapered surface 70 and is provided with a radially extending lever 76 for a purpose as will be hereinafter set forth. A screw 78 extends through the ring 74 and into the enlarged portion of the sleeve 54. A helical spring 80 is disposed around the screw 78 and interposed between the screw and the ring 74 for constantly urging the ring 74 into contact with the horizontal surface 72. A second screw 82 extends through the ring 74 and into the tapered surface 70 for cooperation with the screw 78 to preclude rotational movement of the ring 74. It will be apparent that any downward manual pressure on the lever 76 will move the right hand portion of the ring 74 downwardly toward the tapered surface 70 whereby the inner periphery of the ring 74 will bite into the outer periphery of the mast 42, thus rigidly securing the threaded sleeve 54 to the mast 42.

A plate 84 is welded, or the like, to the lower end 86 of the mast 42 for precluding accidental withdrawal of the mast from the sleeve 54. The plate 84 is preferably provided with an outwardly extending portion 88 adapted to contact the inner periphery of the housing 24 in order to guide the vertical movement of the mast 42 during operation thereof as will be hereinafter set forth.

An angularly disposed support tubing 90 is rigidly secured at one end to the housing 24 in the proximity of the cup 58, and extends outwardly and downwardly therefrom. A transversely disposed cylindrical member 92 is rigidly secured at the opposite end of the tubing 90 and is adapted for disposition on the working surface 22, spaced from the base 14. A tension chain 94 is secured to the base 14 in any well known manner, such as the connection joint 96, and extends to the cylinder 92. The chain 94 is preferably secured to the cylinder 92 by a hook member 98 having an outwardly extending flange 100 provided thereon. A helical spring 102 is disposed around the shank 104 of the hook 98 and is interposed between the flange 100 and the cylinder 92. The shank 104 extends transversely through the cylinder 92, as clearly shown in FIG. 2, and is slidable therein. A cam lever 106 having a cam surface 108 at the lowermost portion thereof is pivotally secured at 110 to the outer extremity of the shank 104. The spring 102 functions to constantly urge the flange 100 and shank 104 in a direction toward the base 14, thus maintaining the cam surface 108 in close contact with the cylinder 92. It will be apparent that the chain 94 will be in less tension when the smaller portion of the cam surface 108 is disposed adjacent the cylinder 92. When the larger portion of the cam surface 108 is moved into contact with the cylinder 92 by manual rotation of the lever 106, the shank 104 will be moved in a direction away from the base 14 to increase the tension in the chain 94.

*Operation*

When it is desired to use the drill 12 for any purpose, the stand 10 is disposed on the ground, or working surface 22, as clearly shown in FIG. 1. The ring 74 is normally in the horizontal position whereby the elevator mast 42 is freely disposed within the housing 24. The mast 42 is elevated or raised by hand until the plate 50 is brought into contact with the ceiling (not shown). The lever arm 76 of the ring 74 is then manually depressed until the inner periphery of the ring bites into the outer periphery of the mast 42. The nut 56 may be manually rotated, preferably in a clockwise direction, but not limited thereto. The threaded connection between the nut 56 and the sleeve 54 cooperates with the longitudinal slot 66 and the flange 64 to cause the sleeve 54 to move upwardly upon clockwise rotation of the nut 56. This upward movement of the sleeve 54 urges the inner periphery of the ring 74 into a tighter engagement with the outer periphery of the mast 42, and thus transfers the upward movement and pressure to the mast 42. The upper end 48 of the mast 42 bears against the shoulder 46 of the shank 44 for urging the plate 50 upwardly against the ceiling. In this manner, the plate 50 may be wedged tightly against the ceiling for providing a rigidity for the stand 10 during the drilling operation.

The cam lever 106 may be manually rotated in a direction for moving the largest portion of the cam surface 108 into engagement with the cylinder 92, thus increasing the tension in the chain 94 and stabilizing the stand 10 during the drilling operation. The collar 30 may be adjusted on the housing 24 as hereinbefore set forth in order to provide substantially any desired working height for the drill 12. The drill 12 may then be utilized in the well known manner for drilling holes in substantially any object.

The drill stand 10 may be quickly removed when the drilling operation is completed by manually rotating the cam lever 106 in an opposite direction for moving the smallest portion of the cam surface 108 adjacent the cylinder 92 and thus releasing the tension in the chain 94. The nut 56 may be backed off, or rotated in a counterclockwise direction whereby the sleeve 54 moves vertically downward with respect to the housing 24. The downward movement of the sleeve 54 releases the pressure of the ring 74 against the outer periphery of the mast 42 whereby the spring 80 urges the ring 74 into the normal horizontal position. This releases the pressure of the ring 74 against the mast 42 and the mast is once more freely disposed within the housing 24. The mast may be lowered by manual sliding or telescoping thereof downwardly in the housing 24 to the desired position.

From the foregoing, it will be apparent that the present invention provides a novel drill stand which may be quickly erected into a rigid supporting position for the drilling operation. In addition, the stand may be stabilized for counter-acting any forces of torque during the drilling operation by increasing the tension in the stabilizing chain, thus providing an efficient supporting of the drill.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A drill support stand comprising a base member adapted for disposition on a working surface, a housing extending upwardly from the base member, a tubular member telescopically disposed within the housing and adapted to be wedged therewith in a rigid supporting disposition for the drill stand, and means cooperating with the base member and housing for stabilizing the stand during operation of the drill, said stabilizing means comprising an angularly disposed support leg having one end secured to the housing, a cylindrical member secured to the opposite end of the support leg and disposed on the working surface, a tension chain interconnecting the cylindrical member and the base, and cam means for varying the tension in the chain to provide said stabilization of the stand.

2. A drill support stand comprising a base member adapted for disposition on a working surface, a housing extending upwardly from the base member, means adjustably secured to the housing for receiving the drill, a mast telescopically disposed within the housing, means cooperating between the housing and the mast for wedging the mast in a rigid supporting disposition for the stand, and means cooperating with the base member and housing for stabilizing the stand during operation of the drill, said stabilizing means comprising an angularly disposed support leg having one end secured to the housing, a cylindrical member secured to the opposite end of the support leg and disposed on the working surface, a tension chain interconnecting the cylindrical member and the base, and cam means for varying the tension in the chain to provide said stabilization of the drill.

3. A drill support stand comprising a base member having a plurality of wheels, means to support the base member independently of its wheels, a housing carried by the base member and extending upwardly therefrom, means carried by the housing for receiving the drill, a mast telescopically disposed within the housing, an apertured cup member disposed around the mast and supported by the housing, a threaded sleeve interposed between the cup member and the mast, a nut member threadedly secured to the sleeve and adjacent the cup member, keying means cooperating between the sleeve and the cup member whereby rotation of the nut will cause vertical movement of the sleeve, an annular ring carried by the sleeve for intermittent connection with the mast whereby the vertical movement of the sleeve will be transmitted to the mast for wedging the mast in a rigid supporting disposition for the stand, and means cooperating between the housing and the base member for stabilizing the stand during operation of the drill, said stabilizing means comprising an angularly disposed support leg having one end secured to the support housing, a cylindrical member secured to the opposite end of the support leg and disposed on a working surface, and a cam means for varying the tension in the chain to provide said stabilization of the stand.

4. A drill support stand comprising a base member having a plurality of wheels and adapted for disposition on a working surface, a plurality of spaced studs extending transversely through the base member whereby the base member may be supported independently of its wheels, a housing carried by the base member and extending upwardly therefrom, adjustable means carried by the housing for receiving the drill, a mast telescopically disposed within the housing, an apertured cup member disposed around the mast and supported by the housing, a threaded sleeve interposed between the cup member and the mast, a nut member threadedly secured to the sleeve and adjacent the cup member, keying means cooperating between the sleeve and the cup member whereby rotation of the nut will cause vertical movement of the sleeve, an annular ring carried by the sleeve for intermittent connection with the mast whereby the vertical movement of the sleeve will be transmitted to the mast for wedging the mast in a rigid supporting disposition for the stand, an angularly disposed support leg having one end secured to the housing, a cylindrical member secured to the opposite end of the support leg and disposed on the working surface, a tension chain interconnecting the cylindrical member and the base, and cam means for varying the tension in the chain to provide stabilization of the mast and housing during operation of the drill.

References Cited in the file of this patent
UNITED STATES PATENTS

| | | |
|---|---|---|
| 472,160 | Clark | Apr. 5, 1892 |
| 942,592 | Schneider | Dec. 7, 1909 |
| 1,324,058 | Marchner | Dec. 9, 1919 |
| 1,499,755 | Stebbins | July 1, 1924 |
| 2,012,628 | Howell | Aug. 27, 1935 |
| 2,244,778 | Horsley | June 10, 1941 |
| 2,298,741 | Lazna | Oct. 13, 1942 |
| 2,451,733 | Hochwarder | Oct. 19, 1948 |
| 2,473,947 | Hamstrom | June 21, 1949 |
| 2,532,168 | Jakoubek | Nov. 28, 1950 |
| 2,637,313 | White | May 5, 1953 |